(12) United States Patent
Kim

(10) Patent No.: US 10,784,914 B1
(45) Date of Patent: Sep. 22, 2020

(54) SMART MOBILE PHONE SHELL

(71) Applicant: Jin Woo Kim, Seongnam-si (KR)

(72) Inventor: Jin Woo Kim, Seongnam-si (KR)

( * ) Notice: Subject to any disclaimer, the term of this patent is extended or adjusted under 35 U.S.C. 154(b) by 0 days.

(21) Appl. No.: 16/716,603

(22) Filed: Dec. 17, 2019

(30) Foreign Application Priority Data

Sep. 19, 2019 (KR) ........................ 20-2019-0003853

(51) Int. Cl.
*H04B 1/38* (2015.01)
*H04M 1/02* (2006.01)
*H04B 1/3877* (2015.01)
*H04B 1/3888* (2015.01)
*H04M 1/725* (2006.01)
*A45C 11/00* (2006.01)
*A45F 5/10* (2006.01)
*A45F 5/00* (2006.01)

(52) U.S. Cl.
CPC ............ *H04B 1/3877* (2013.01); *A45C 11/00* (2013.01); *A45F 5/10* (2013.01); *H04B 1/3888* (2013.01); *H04M 1/725* (2013.01); *A45C 2011/002* (2013.01); *A45C 2200/15* (2013.01); *A45F 2005/002* (2013.01); *A45F 2200/0516* (2013.01)

(58) Field of Classification Search
CPC .......... H04B 1/30; H04B 1/3888; H04B 1/38; H04M 1/04
See application file for complete search history.

(56) References Cited

U.S. PATENT DOCUMENTS

| | | | |
|---|---|---|---|
| 10,278,299 B2* | 4/2019 | Kim | F16B 11/006 |
| 10,581,480 B1* | 3/2020 | Kim | H04M 1/04 |
| 10,694,835 B2* | 6/2020 | Peterson | A45C 11/00 |
| 2014/0364176 A1* | 12/2014 | Pintor | H04B 1/385 455/575.6 |
| 2017/0104854 A1* | 4/2017 | Park | A45C 11/00 |
| 2018/0013463 A1* | 1/2018 | Jeon | A45F 5/10 |
| 2019/0141174 A1* | 5/2019 | Britt | H04M 1/6041 |
| 2019/0230205 A1* | 7/2019 | Lee | H04M 1/04 |

FOREIGN PATENT DOCUMENTS

| | | |
|---|---|---|
| KR | 10-1392562 B1 | 5/2014 |
| KR | 10-1856447 B1 | 5/2018 |
| KR | 20-0488626 Y1 | 2/2019 |

* cited by examiner

*Primary Examiner* — Blane J Jackson
(74) *Attorney, Agent, or Firm* — KORUS Patent, LLC; Seong Il Jeong

(57) ABSTRACT

The invention relates to a smart mobile phone shell. The smart mobile phone shell includes a shell body, a fixing component, a rotating component and a support ring. The invention has the effects of easy disassembly and safe use while safely protecting mobile phone.

2 Claims, 8 Drawing Sheets

SMART MOBILE PHONE SHELL

TECHNICAL FIELD

The invention relates to a smart mobile phone shell.

BACKGROUND

The patent disclosed in Republic of Korea registered patent No. 1392256 (registration date: 2014.04.29, title of invention: shell having replaceable module for portable terminal) has the advantages of unfolding an operation portion by simple operation and placing a portable terminal with a desired angle. On the other hand, to achieve that a connector is rotationally combined with an assembling-disassembling groove, the shell becomes thick, in addition, owing to the tail end rotating manner of the connector, the durability is reduced due to repeated use, and the probability of breakage is increased, so that the prior art has the disadvantage of being unstable when it is placed.

To eliminate the disadvantage, the applicant proposes a scheme issued in republic of Korea registered utility model No. 0488626 (registration date: 2019.02.22, title of utility model: rotatable mobile phone shell), which can safely and conveniently use mobile phone while protecting mobile phone. On the other hand, due to the high machining precision of each component, it has the problem of difficult processing and assembly.

SUMMARY OF INVENTION

To solve the above problem, the invention provides a smart mobile phone shell, which has no protrusion portion on a shell body, so that the shell body is beautiful, can safely and strongly grip the shell, and has easy processing and assembly.

The object of the invention is realized by the following smart mobile phone shell. The smart mobile phone shell comprises: a shell body having front-opening hollow structure and formed with a coupling through hole on back surface; a fixing component comprising a ring-shaped fixing component body and a coupling concave portion, wherein the fixing component body is inserted into the coupling through hole, and the coupling concave portion is formed on the inner circumferential surface of the fixing component body; a rotating component comprising a ring-shaped rotating component body, multiple coupling convex portions, a support ring coupling concave portion and a spring insertion portion, wherein the coupling convex portions are formed on the outer circumferential surface of the rotating component body and rotationally coupled with the coupling concave portion, the support ring coupling concave portion is formed at one side of the inner circumferential surface of the rotating component body, and the spring insertion portion is formed on the inner circumferential surface of the rotating component body and communicated to the two end portions of the support ring coupling concave portion; and a support ring comprising a ring-shaped support ring body and a pull-out end portion, wherein one end portion of the outer circumferential surface of the support ring body is rotationally inserted into the support ring coupling concave portion, a spring insertion groove is formed on the outer circumferential surface, and the pull-out end portion is formed at the other end portion of the outer circumferential surface of the support ring body.

Preferably, the coupling convex portion of the invention comprises a convex body and coupling convexes, and the coupling convexes are separated by distance from the outer circumferential surface of the rotating component body and formed on two ends of the convex body; and the coupling convexes have symmetric shape with a phantom line connecting from the center of the rotating component body to the convex body as reference.

Preferably, the coupling through hole of the invention is formed with a step surface on the inner circumferential surface of the back surface, the coupling through hole is formed with a step surface on the inner circumferential surface of the back surface, and the fixing component body is formed with multiple spaced coupling long grooves in front surface; and the smart mobile phone shell also comprises a cover, wherein the cover comprises a cover body and multiple coupling convex pieces, the cover body is inserted into the step surface, and the multiple coupling convex pieces are formed at one side surface edge of the cover body and inserted in the coupling long grooves.

As mentioned, without forming protrusion portion of mobile phone shell, the invention also has the effects of easy assembly and disassembly while safely protecting mobile phone, and can realize safe use.

Figure 1:
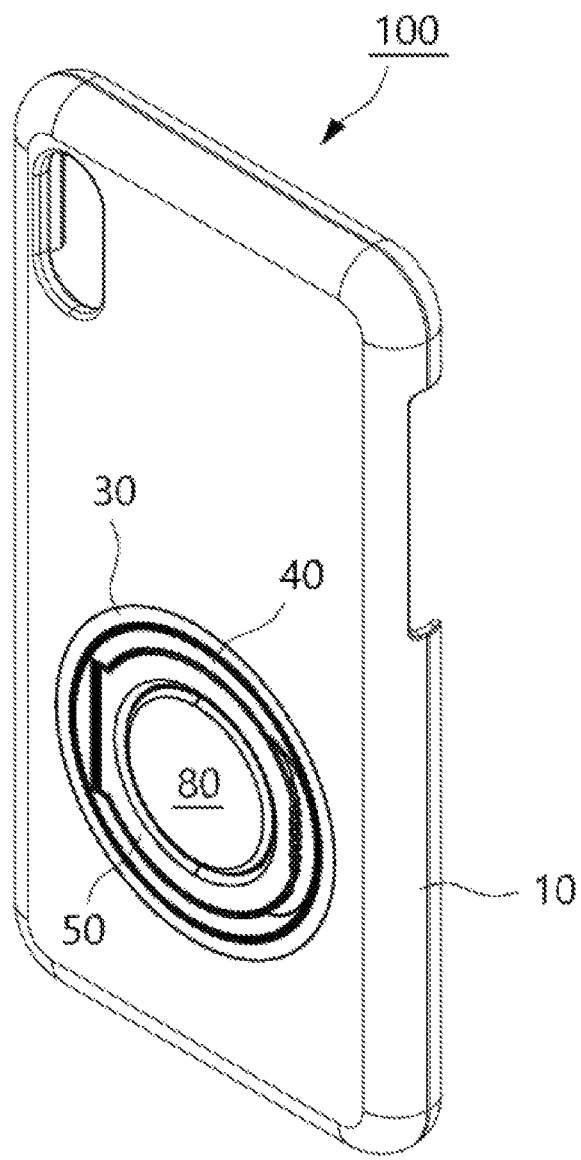
FIG. 1 illustrates stereoscopic view of the smart mobile phone shell in accordance with the invention.

Wherein the drawing reference numerals are as follows:
 10: shell body; 30: fixing component; 40: rotating component; 50: support ring; 70: spring; 80: cover; 100: smart mobile phone shell.

DETAILED DESCRIPTION

Hereinafter, the invention is described in reference to the drawings.

Figure 2:
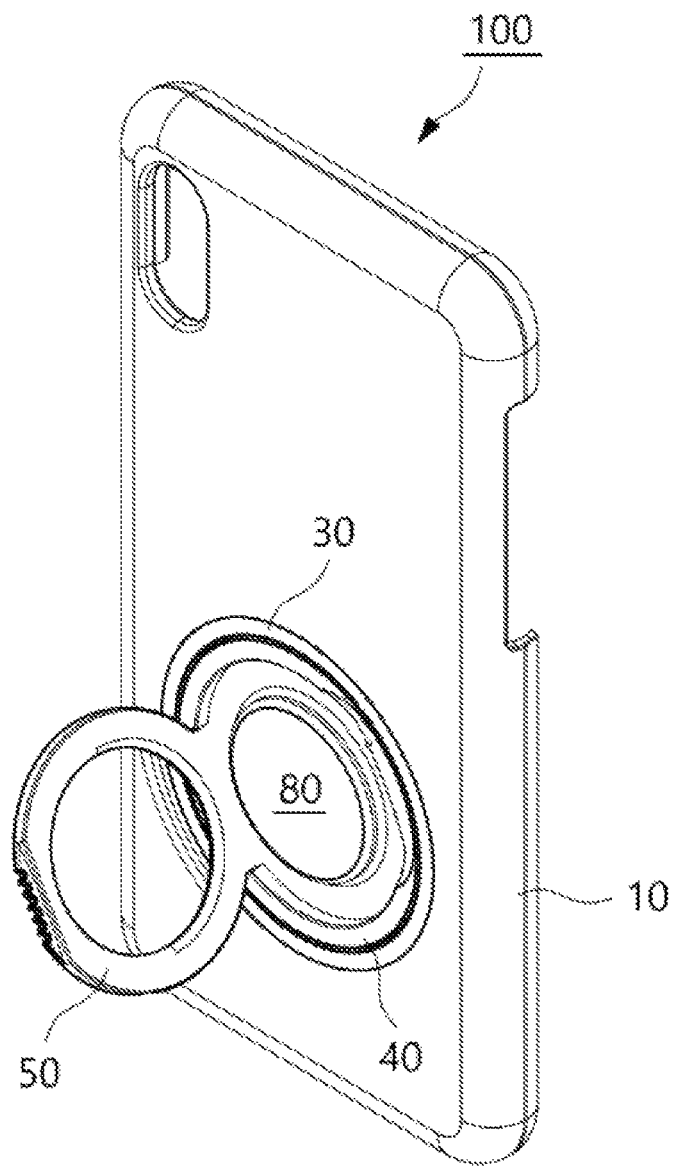
FIG. 2 illustrates stereoscopic view of the smart mobile phone shell of FIG. 1 at state of unfolding the support ring.
Figure 3:
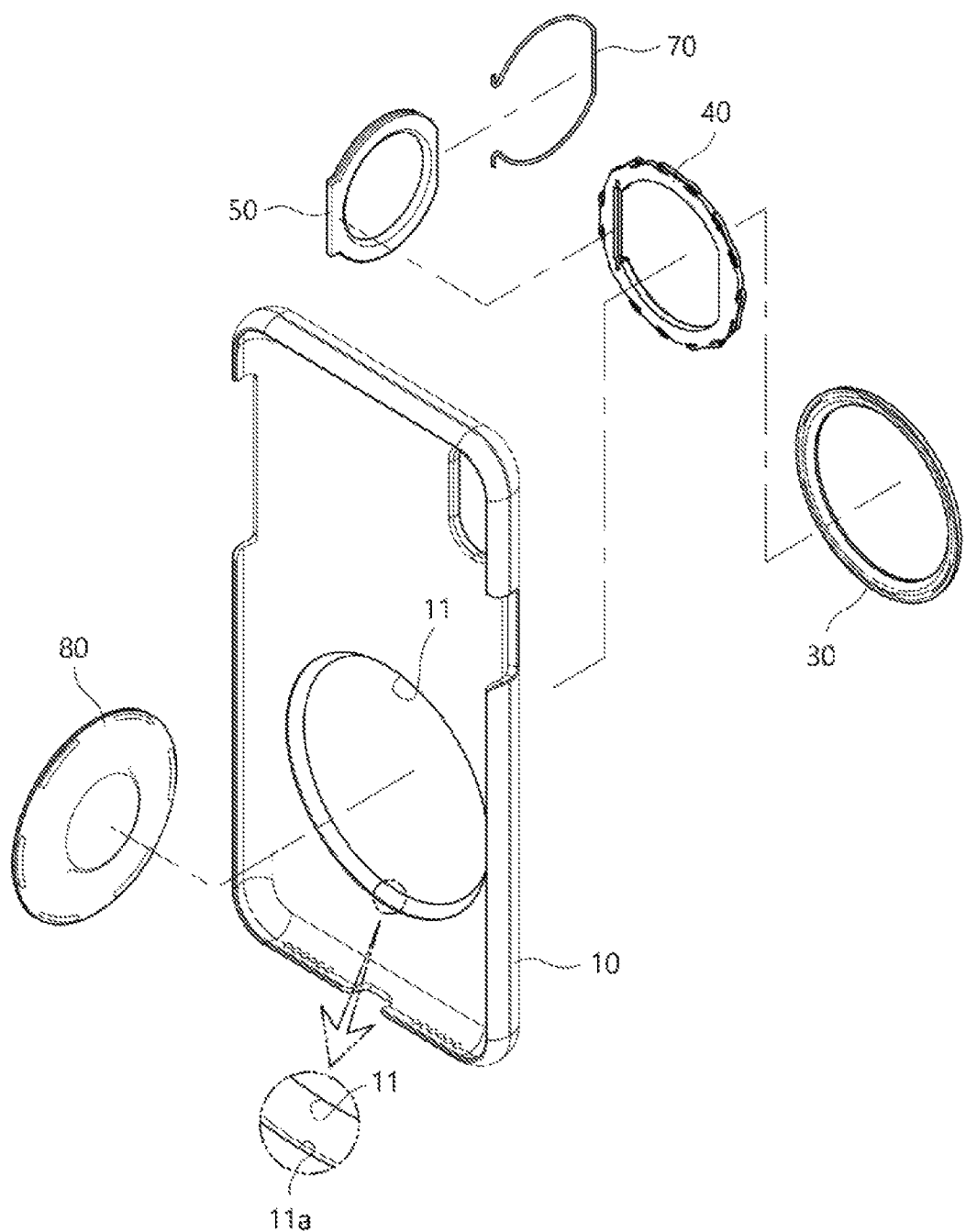
FIG. 3 illustrates stereoscopic view of disassembled back surface of FIG. 1.
Figure 4:
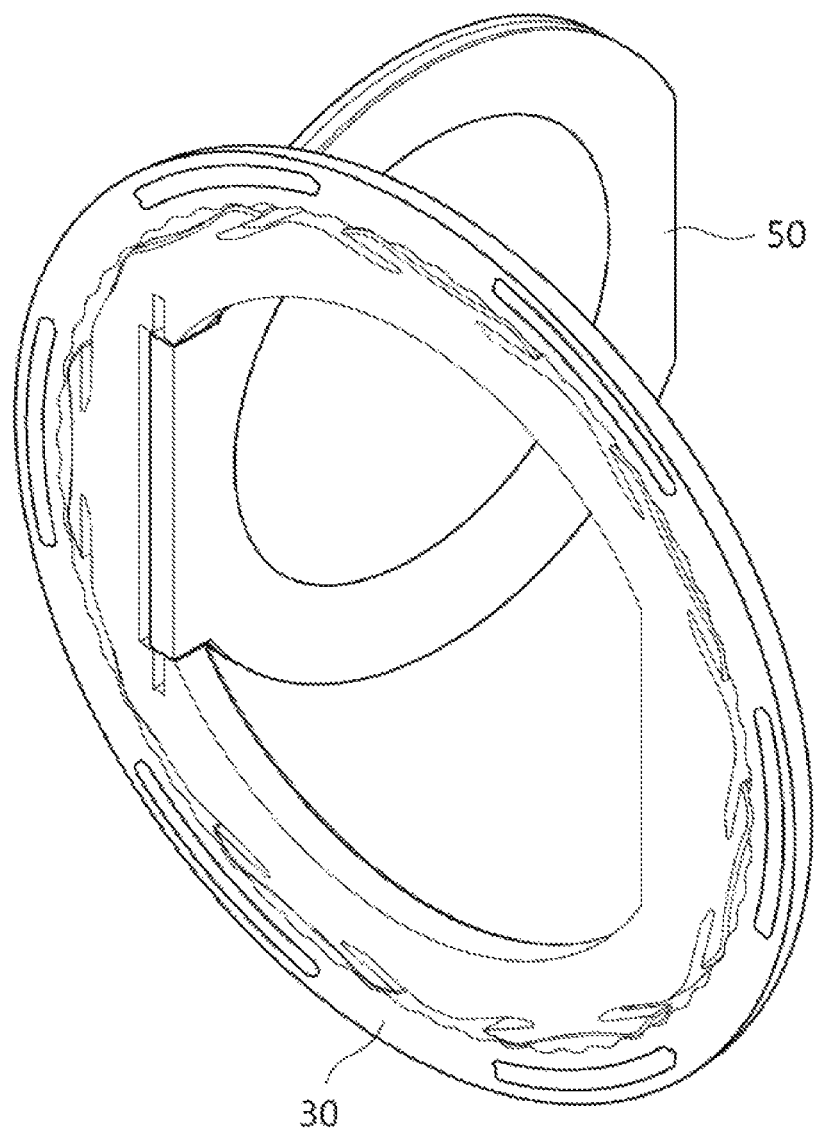
FIG. 4 illustrates stereoscopic view of coupling relationship of the fixing component, the rotating component and the support ring.
Figure 5:
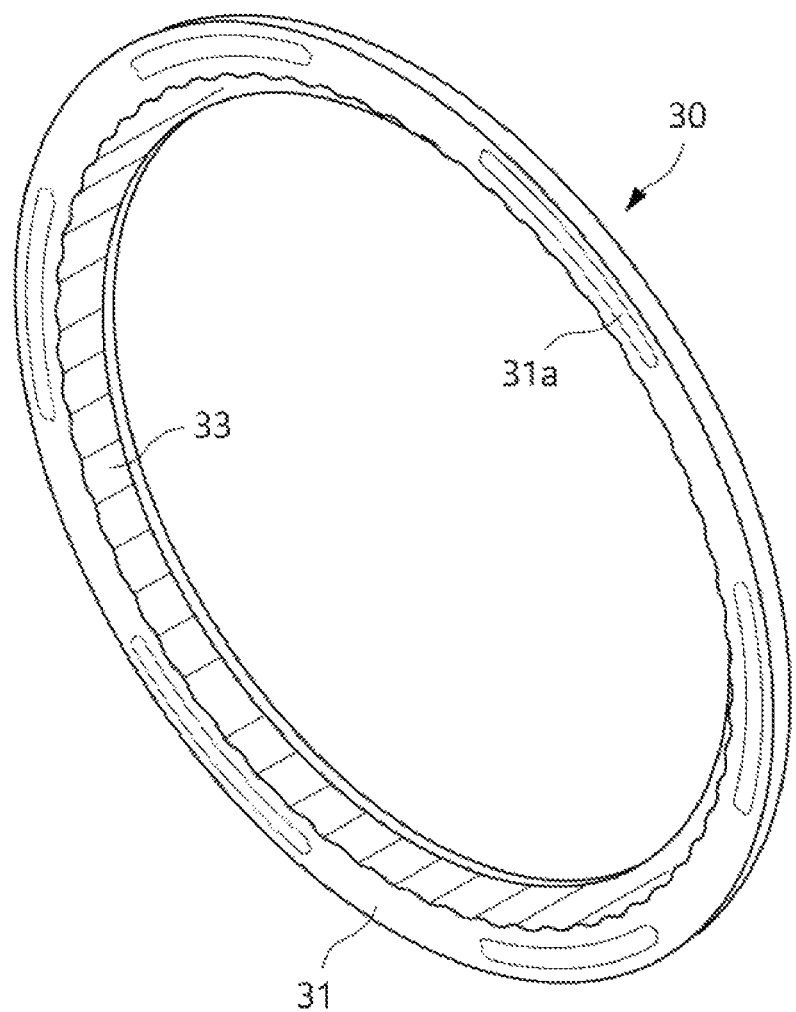
FIG. 5 illustrates stereoscopic view of the fixing component.
Figure 6:
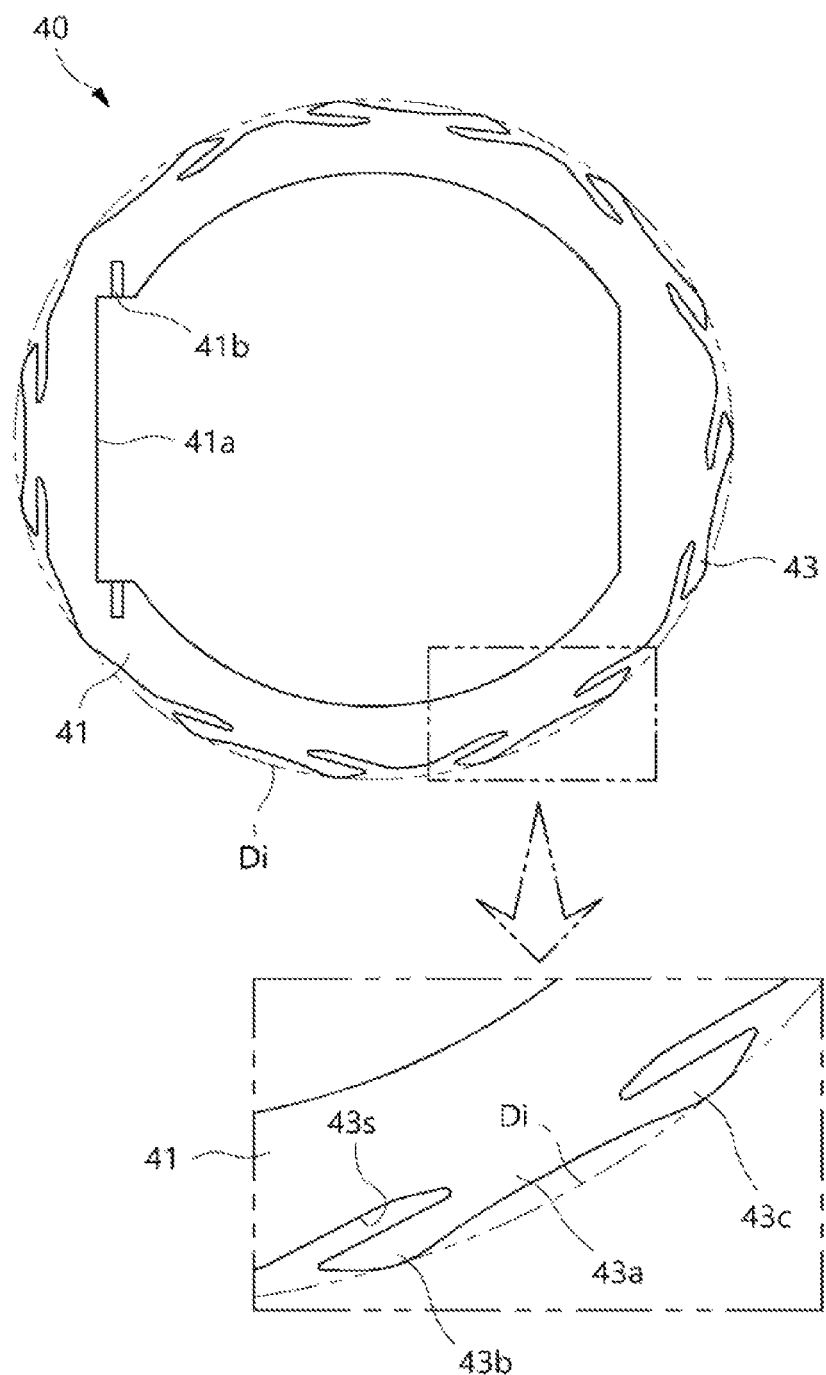
FIG. 6 illustrates stereoscopic view of the rotating component.
Figure 7:
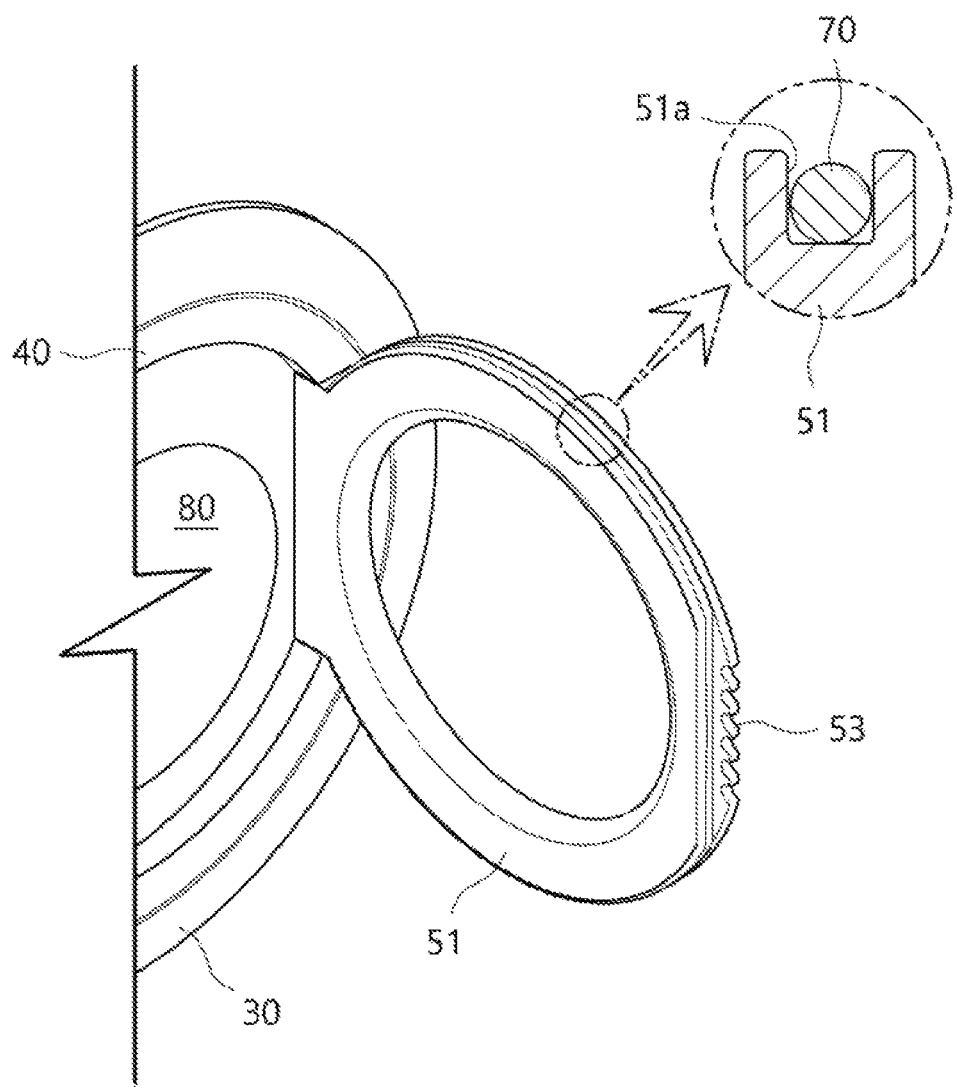
FIG. 7 illustrates stereoscopic view of coupling relationship of the fixing component, the rotating component, the cover and the support ring.
Figure 8:
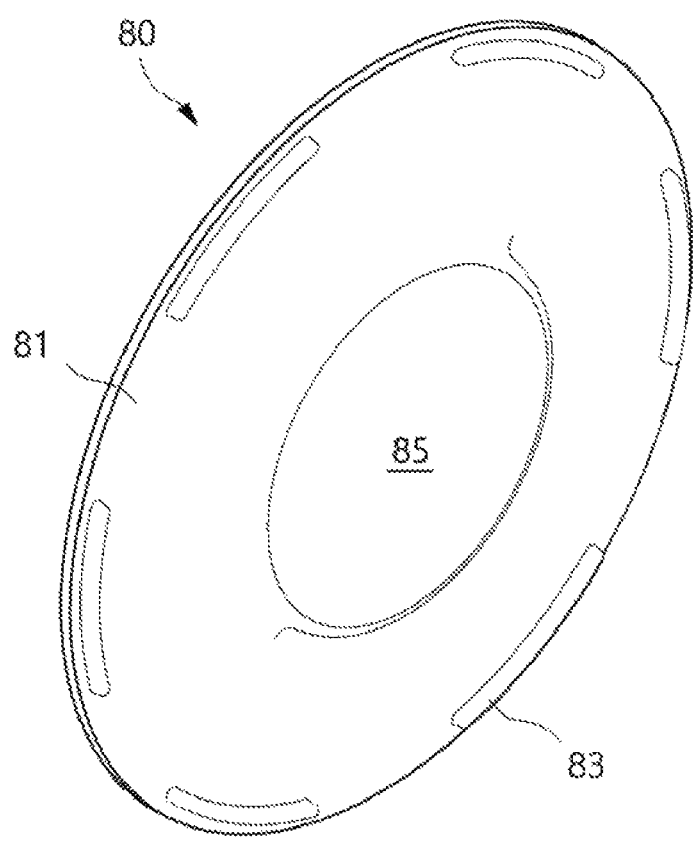
FIG. 8 illustrates stereoscopic view of the cover.

Referring to FIGS. 1-8, the smart mobile phone shell 100 comprises a shell body 10, a fixing component 30, a rotating component 40, a support ring 50, a spring 70 and a cover 80.

The shell body 10 has front-opening hollow structure, and is formed with a plurality of through holes (not shown) on upper surface and side surface. The through holes of the shell body 10 are formed to expose a camera button, an earphone socket, a power button, etc. of mobile phone (not shown), which are unnecessary constituent elements of the technical idea of the embodiment, and detailed descriptions or illustrations of them are omitted.

Further, the shell body 10 is formed with a coupling through hole 11 on back surface. The coupling through hole 11 is formed with a step surface 11a on the inner circumferential surface of the back surface.

The fixing component 30 comprises a ring-shaped fixing component body 31 inserted into the coupling through hole 11, and a coupling concave portion 33 formed on the inner circumferential surface of the fixing component body 31. The outer circumferential surface of the fixing component 30 is compulsively inserted and fixed to the inner circumferential surface of the coupling through hole 11 of the shell body 10, and the coupling concave portion 33 has serration shape. In addition, the fixing component body 31 is formed with multiple spaced coupling long grooves 31a in front surface.

The rotating component 40 comprises a ring-shaped rotating component body 41, and multiple coupling convex portions 43 formed on the outer circumferential surface of the rotating component body and rotationally coupled with the coupling concave portion 33. In addition, the rotating component 40 also comprises a support ring coupling concave portion 41a formed at one side of the inner circumferential surface of the rotating component body 41, and a spring insertion portion 41b formed on the inner circumferential surface of the rotating component body 41 and communicated to the two end portions of the support ring coupling concave portion 41a. Hereby, the coupling convex portion 43 comprises a convex body 43a, and coupling convexes 43b and 43c separated by distance from the outer circumferential surface of the rotating component body 41 and formed on two ends of the convex body 43a. Unspecified numeral 43s expresses gap between the outer circumferential surface of the rotating component body 41 and the coupling convexes 43b and 43c. In addition, the coupling convexes 43b and 43c have symmetric shape with a phantom line connecting from the center of the rotating component body 41 to the convex body 43a as reference.

In addition, the phantom outer diameter Di of the rotating component 40 is consistent with the peak height of the coupling convexes 43b and 43c and is larger than the inner diameter of the fixing component body 31. Therefore, when the rotating component 40 is compulsively inserted into the fixing component 30, insertion is performed while the gap 43s is reduced, so that falling-off or separation is prevented until external force is applied.

Furthermore, the coupling convexes 43b and 43c of the embodiment have symmetric shape, so that the rotating component 40 smoothly rotates toward clockwise direction CW or anticlockwise direction CCW and is fixed in the coupling concave portion 33.

The support ring 50 comprises a support ring body 51 and a pull-out end portion 53. One end portion of the outer circumferential surface of the support ring body 51 is rotationally inserted into the support ring coupling concave portion 41a, a spring insertion groove 51a is formed on the outer circumferential surface, and the pull-out end portion 53 is formed at the other end portion of the outer circumferential surface. The pull-out end portion 53 is formed as concave portion. However, the pull-out end portion 53 is not limited to be formed as concave portion and can be deformed as convex portion.

The spring 70 is inserted into the spring insertion groove 51a, and the opened two end portions are compulsively pressed into the spring insertion portion 41b. The spring 70 is a-shaped spring.

The cover 80 comprises a cover body 81 and multiple coupling convex pieces 83. The cover body 81 is inserted into the step surface 11a. The multiple coupling convex pieces 83 are formed at one side surface edge of the cover body 81 and inserted in the coupling long grooves 31a. In addition, the cover 80 also comprises a circular convex portion 85 at one side surface center of the cover body 81. The circular convex portion 85 is configured to be accommodated in the inner circumferential surface of the support ring body 51 for preventing shaking or movement when the support ring 50 is at unexpanded state.

The invention as mentioned is described by, but is not limited to, one embodiment. It is obvious that all embodiments deformed on the basis of the technical idea of the invention belong to the right scope of the invention.

What is claimed is:

1. A smart mobile phone shell, comprising:
   a shell body having front-opening hollow structure and formed with a coupling through hole on back surface;
   a fixing component comprising a ring-shaped fixing component body and a coupling concave portion, wherein the fixing component body is inserted into the coupling through hole, and the coupling concave portion is formed on the inner circumferential surface of the fixing component body;
   a rotating component comprising a ring-shaped rotating component body, multiple coupling convex portions, a support ring coupling concave portion and a spring insertion portion, wherein the coupling convex portions are formed on the outer circumferential surface of the rotating component body and rotationally coupled with the coupling concave portion, the support ring coupling concave portion is formed at one side of the inner circumferential surface of the rotating component body, and the spring insertion portion is formed on the inner circumferential surface of the rotating component body and communicated to the two end portions of the support ring coupling concave portion; and
   a support ring comprising a ring-shaped support ring body and a pull-out end portion, wherein one end portion of the outer circumferential surface of the support ring body is rotationally inserted into the support ring coupling concave portion, a spring insertion groove is formed on the outer circumferential surface, and the pull-out end portion is formed at the other end portion of the outer circumferential surface of the support ring body,
   wherein the coupling convex portion comprises a convex body and coupling convexes, and the coupling convexes are separated by distance from the outer circumferential surface of the rotating component body and formed on two ends of the convex body; and the coupling convexes have symmetric shape with a phantom line connecting from the center of the rotating component body to the convex body as reference.

2. A smart mobile phone shell, comprising:
   a shell body having front-opening hollow structure and formed with a coupling through hole on back surface;
   a fixing component comprising a ring-shaped fixing component body and a coupling concave portion, wherein the fixing component body is inserted into the coupling through hole, and the coupling concave portion is formed on the inner circumferential surface of the fixing component body;
   a rotating component comprising a ring-shaped rotating component body, multiple coupling convex portions, a support ring coupling concave portion and a spring insertion portion, wherein the coupling convex portions are formed on the outer circumferential surface of the rotating component body and rotationally coupled with the coupling concave portion, the support ring coupling concave portion is formed at one side of the inner circumferential surface of the rotating component body, and the spring insertion portion is formed on the inner circumferential surface of the rotating component body and communicated to the two end portions of the support ring coupling concave portion; and a support ring comprising a ring-shaped support ring body and a pull-out end portion, wherein one end portion of the outer circumferential surface of the support ring body is rotationally inserted into the support ring coupling concave portion, a spring insertion groove is formed on the outer circumferential surface, and the pull-out end portion is formed at the other end portion of the outer circumferential surface of the support ring body, wherein the coupling through hole is formed with a step surface on the inner circumferential surface of the back surface, and the fixing component body is formed with multiple spaced coupling long grooves in front surface; and the smart mobile phone shell also comprises a cover, wherein the cover comprises a cover body and multiple coupling convex pieces, the cover body is inserted into the step surface, and the multiple coupling convex pieces are formed at one side surface edge of the cover body and inserted in the coupling long grooves.

\* \* \* \* \*